C. HUBING.
Water and Beer Coolers.
No. 136,600.            Patented March 11, 1873.
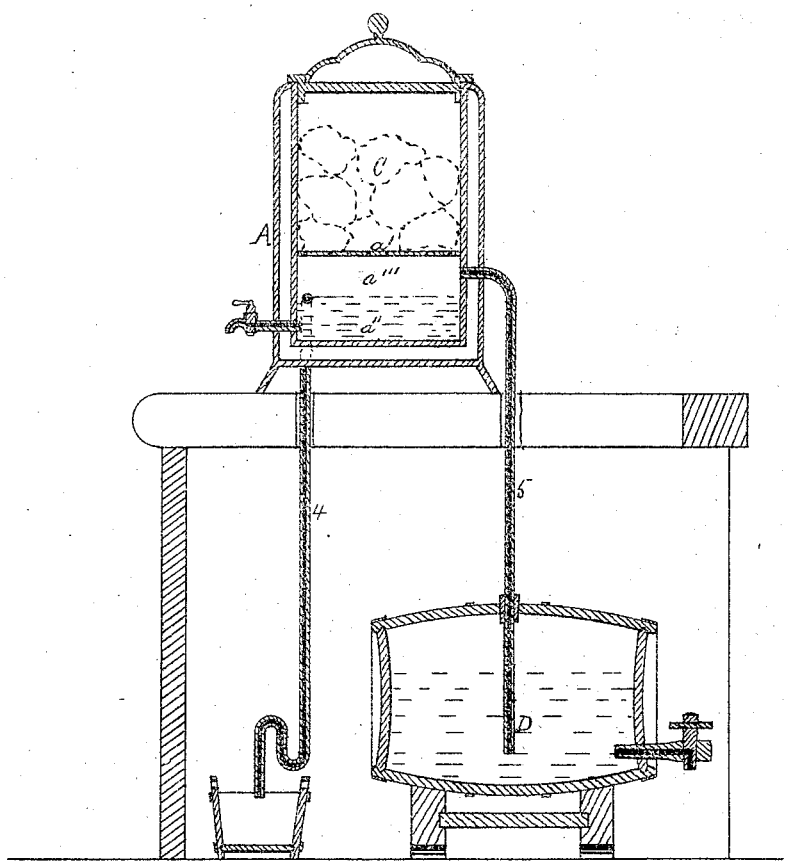
WITNESSES:          INVENTOR:
Benj Morison          Charles Hubing
Wm H. Morison.
AM. PHOTO-LITHOGRAPHIC CO. N.Y.(OSBORNE'S PROCESS.)

UNITED STATES PATENT OFFICE.

CHARLES HUBING, OF PHILADELPHIA, PENNSYLVANIA.

IMPROVEMENT IN WATER AND BEER COOLERS.

Specification forming part of Letters Patent No. 136,600, dated March 11, 1873.

*To all whom it may concern:*

Be it known that I, CHARLES HUBING, of the city of Philadelphia, in the State of Pennsylvania, have invented a certain Improved Mode of Cooling Beer on Draft, of which the following is a specification:

My invention relates to the combination and arrangement of a water-cooler and a barrel or cask of beer on draft, in such a manner that, as the beer is drawn out of the cask, cold air will flow down from the interior of the water-cooler above, and thus supply its place with ice-cold air, and consequently keep the beer in a cold condition during the warm temperature of the bar-room or saloon containing the cask; the object of my invention being to afford a very simple and inexpensive apparatus for the purpose of cooling beer on draft, and a great economy in the quantity of ice heretofore required for the same purpose.

I take a large-sized water-cooler provided with a transverse perforated partition for supporting the ice above the water-space, so as to leave an air-space between the said partition and the water-surface below, the latter being prevented from rising above a certain height by a drain-pipe arranged to pass down through the bar or other support for the cooler, and end with a "goose-neck" outlet, to prevent the return of warm air. I then connect a pipe or flexible tube with the interior of the air-space in the cooler, and pass or extend it down through the bar-platform, and insert its lower end into the barrel or cask of beer, under the bar or platform, or, if preferred, in the cellar.

In the drawing, A represents the water-cooler, upon the platform B of a bar; $a'$, the perforated partition for supporting the ice C; $a''$, the water-space; $a'''$, the air-space between the water-space and the partition; 4, the goose-neck drain-pipe; 5, the pipe or tube which gives free communication between the air-space $a'''$ and the interior of the cask of beer D, below the platform B.

It will be understood, without further description or explanation, that if a proper supply of ice be in the cooler A, and a glass or more of beer be drawn from the cask D, the space previously occupied by the withdrawn beer will be filled by the cold air passing from the space $a'''$ down through the tube 5 into the cask D; and that as the ice melts, in cooling the air which enters between the cover and the body of the cooler, the water-space $a''$ will gradually fill up to the mouth of the drain-pipe 4 and run out, and thus prevent the air-space from being encroached upon by an excess of water, and the water in the goose-neck preventing, at the same time, any access of warm air up through the drain-pipe.

Heretofore the whole cask of beer had to be surrounded with ice to keep it cool in warm weather; but by the use of my invention the comparatively trifling quantity of ice required to cool the air which enters the cask of beer or other beverage on draft renders the invention one of importance, in view of economy, and without detracting from the efficiency of the ice-tank as a water-cooler and ready resource for a glass of iced water to any one who may choose to avail himself of the luxury. I do not, however, intend to confine myself to the use of a water-cooler as such, in combination with the cask containing the beverage on draft, because the main object of my invention is to supply cold air to take the place or space left by the beverage as the latter is withdrawn from the cask; and hence an ice-tank through which air will pass so as to become cold before it enters the beverage-cask will accomplish the main object— *i. e.*, the cooling of the liquid in the said cask.

I claim as my invention—

1. The water-cooler A, so constructed that, by the withdrawal of beer or other liquid from a separate receptacle communicating therewith, air entering the cooler will permit cold air in the cooler to pass into the said receptacle, substantially in the manner and for the purpose set forth.

2. The water-cooler A, cold-air exit 5, overflow 4, and partition or perforated ice-supporter $a'$, combined and operating substantially as described.

CHARLES HUBING.

Witnesses:
BENJ. MORISON,
WM. H. MORISON.